(12) United States Patent
Teraoka et al.

(10) Patent No.: US 7,852,573 B2
(45) Date of Patent: Dec. 14, 2010

(54) IMAGE TAKING LENS (75) Inventors: Hiroyuki Teraoka, Osaka (JP); Junji Kitamura, Takatsuki (JP); Masao Nishiyama, Takatsuki (JP)

(73) Assignee: Komatsulite Mfg. Co., Ltd., Suita-shi (JP)

( * ) Notice: Subject to any disclaimer, the term of this patent is extended or adjusted under 35 U.S.C. 154(b) by 0 days.

(21) Appl. No.: 12/342,326

(22) Filed: Dec. 23, 2008

(65) Prior Publication Data
US 2009/0185294 A1 Jul. 23, 2009

(30) Foreign Application Priority Data
Jan. 17, 2008 (JP) .............. 2008-008130

(51) Int. Cl.
*G02B 9/06* (2006.01)
(52) U.S. Cl. ..................... 359/794; 359/793
(58) Field of Classification Search ............. 359/793, 359/794, 792, 791, 785, 784, 689–691
See application file for complete search history.

(56) References Cited
U.S. PATENT DOCUMENTS
5,798,872 A * 8/1998 Uzawa ............ 359/686

7,167,324 B2 1/2007 Saito
7,372,639 B2 * 5/2008 Kim ............... 359/717
2007/0053072 A1 * 3/2007 Nanba .............. 359/689

FOREIGN PATENT DOCUMENTS
JP 2005-121685 5/2005
JP 2006-350275 12/2006

* cited by examiner

*Primary Examiner*—Timothy J Thompson
(74) *Attorney, Agent, or Firm*—Oblon, Spivak, McClelland, Maier & Neustadt, L.L.P.

(57) ABSTRACT

An image taking lens LA comprises an aperture S1, a first lens L1 and a second lens L2 which are arranged in this order from an object side to an image side. The first lens L1 has a positive power and a meniscus shape with a convex surface facing an object; and the second lens L2 has a positive power with a convex surface facing an image. The first lens L1 and the second lens L2 satisfy the following formulae (1) and (2):

$$0.30 < R1/R2 < 0.65 \quad (1)$$

$$0.30 < d3/F < 0.50 \quad (2)$$

This image taking lens formed of the two lenses is small in size and has a high optical performance, in which the entire image taking lens has a short focal length.

6 Claims, 9 Drawing Sheets

FIG. 4A ASTIGMATISM

FIG. 4B DISTORTION

FIG. 5 LATERAL CHROMATIC ABBERATION

SPHERICAL ABBERATION
(LONGITUDINAL CHROMATIC ABBERATION)

FIG. 8A
ASTIGMATISM

FIG. 8B
DISTORTION

FIG. 9
LATERAL CHROMATIC ABBERATION

SPHERICAL ABBERATION
(LONGITUDINAL CHROMATIC ABBERATION)

FIG. 12A
ASTIGMATISM

FIG. 12B
DISTORTION

FIG. 13
LATERAL CHROMATIC ABBERATION

SPHERICAL ABBERATION
(LONGITUDINAL CHROMATIC ABBERATION)

FIG. 16A
ASTIGMATISM

FIG. 16B
DISTORTION

FIG. 17
LATERAL CHROMATIC ABBERATION

IMAGE TAKING LENS

BACKGROUND OF THE INVENTION

1. Field of the Invention

The present invention relates to a compact image taking lens which has a high optical performance and is formed of two lenses and suitable for a compact imaging apparatus, an optical sensor, a module camera of a mobile phone, a web camera, and so on which use a solid-state imaging device such as a high resolution CCD or CMOS.

2. Description of the Related Art

In recent years, various kinds of imaging apparatuses using a solid-state imaging device such as a CCD or a CMOS are widely spread. Following miniaturization and improvement in performance of the imaging device, a compact and lightweight image taking lens having a high optical performance is required. Many studies have been done to provide an image taking lens satisfying both miniaturization and high optical performance. As the performance of the solid-state imaging device such as a CCD increases, an image taking lens even smaller in size and higher in optical performance is now required. In order to downsize the image taking lens, it is advantageous to reduce the number of lenses forming the image taking lens. However, in order to obtain a higher optical performance, it is advantageous to increase the number of lenses because it makes it easier to appropriately correct various aberrations and obtain an image taking lens having a high optical performance. Considering these, there has been proposed an image taking lens which is formed of two lenses and achieves a good balance between downsizing and optical performance.

Japanese Laid-open Patent Publications 2005-121685 and 2006-350275 each disclose a conventional image taking lens comprising, in order from an object side, a first lens having a positive power and a meniscus shape with a convex surface facing an object, and a second lens having a positive power and biconvex surfaces. In such conventional image taking lenses, the first lens has a large center thickness and a large radius of curvature on both the object side and the image side. Thus, the entire image taking lens is likely to have a relatively long focal length, and it may be difficult to sufficiently reduce its size and correct aberrations. Note that here the power of the lens is given by the inverse of the focal length.

SUMMARY OF THE INVENTION

The present invention has been conceived to solve the above-described problems of the prior arts, and an object of the present invention to provide an improved image taking lens which is formed of two lenses having a small center thickness and is small in size and has a high optical performance, thereby enabling the entire image taking lens to have a short focal length.

An image taking lens in accordance with an aspect of the present invention comprises an aperture, a first lens and a second lens which are arranged in this order from an object side to an image side. The first lens has a positive power and a meniscus shape with a convex surface facing an object and a concave surface facing an image. The second lens has a positive power with a convex surface facing the image. The first lens and the second lens satisfy the following formulae (1) and (2):

$$0.30 < R1/R2 < 0.65 \tag{1}$$

$$0.30 < d3/F < 0.50 \tag{2}$$

where
- $R1$: radius of curvature of the convex surface of the first lens facing the object;
- $R2$: radius of curvature of the concave surface of the first lens facing the image;
- $d3$: center thickness of the second lens; and
- $F$: focal length of the entire image taking lens.

According to such a configuration, it is possible to obtain an image taking lens which is formed of two lenses and small in size, and which has a high optical performance. The image taking lens with the configuration of the present invention can be used in an imaging module for a module camera of a mobile phone, a web camera, a personal computer, a digital still camera, an optical sensor or a monitor for various industrial apparatuses such as an automobile and so on, and can contribute to downsizing, weight reduction and improvement in performance of these apparatuses.

It is preferable that the second lens of the image taking lens is a biconvex lens. This makes it easier to obtain an image taking lens which is formed of two lenses and small in size, and which has a high optical performance.

Furthermore, it is preferable that the ratio $R1/R2$ in formula (1) is larger than 0.40, more preferably larger than 0.50. This further makes it easier to obtain an image taking lens which is formed of two lenses and small in size, and which has a high optical performance.

Still furthermore, it is preferable that the image taking lens further satisfies the following formulae (3) and (4):

$$0.60 < d1/d2 < 1.80 \tag{3}$$

$$0.40 < d1/d3 < 0.85 \tag{4}$$

where
- $d1$: center thickness of the first lens; and
- $d2$: distance between the surface of the first lens facing the image and the surface of the second lens facing the object.

This further makes it easier to obtain an image taking lens which is formed of two lenses and small in size, and which has a high optical performance.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, in which.

DETAILED DESCRIPTION OF THE EMBODIMENT

Figure 1:
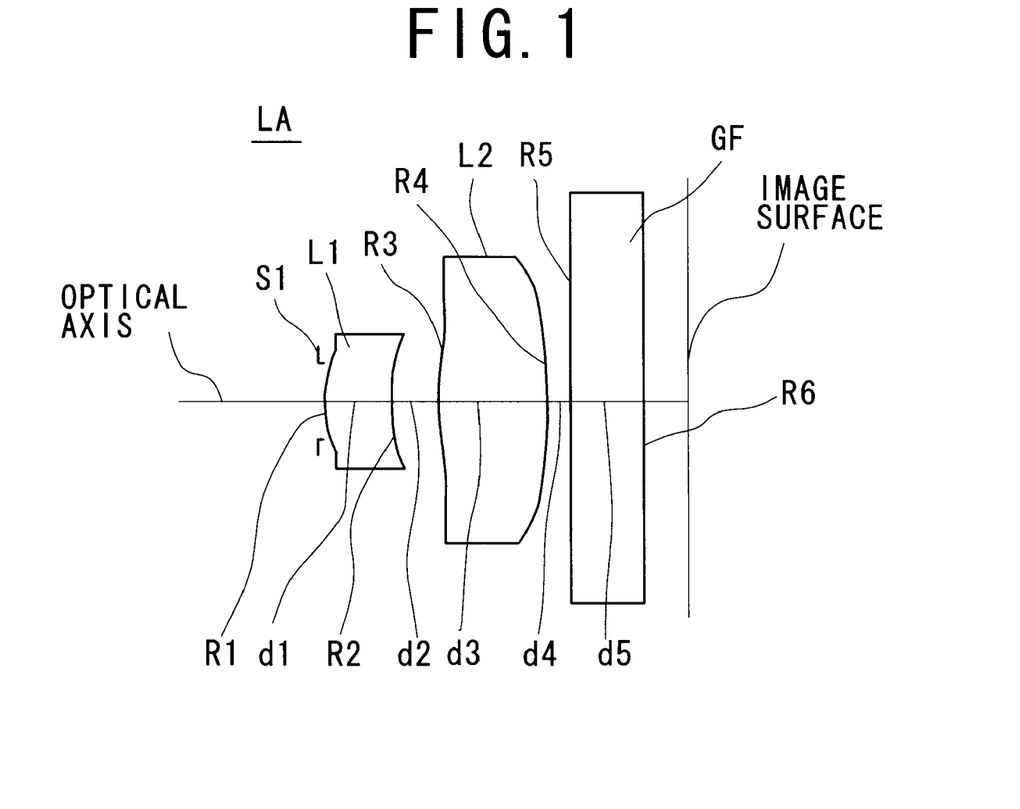
FIG. 1 is a diagram showing a basic configuration of an image taking lens in accordance with an embodiment of the present invention.

An image taking lens LA in accordance with an embodiment of the present invention will be described with reference to the figures. A basic configuration of the image taking lens LA in accordance with this embodiment is shown in FIG. 1. The image taking lens LA has a lens system formed of two lenses and comprising an aperture (stop) S1, a first lens L1 and a second lens L2, which are arranged in this order from an object (not shown) to an image. A parallel glass plate GF made of a glass material is further disposed between the second lens L2 and the image (image surface). A cover glass, an IR (infrared light) cut filter or a low-pass filter can be used for the parallel glass plate GF.

By disposing the aperture S1 closer to the object than the first lens L1, an entrance pupil can be located at a position distant or far from the image surface. This allows the image taking lens LA to have high telecentric characteristics, making it possible to suitably adjust an incident angle of a light beam to the image surface.

The first lens L1 is a lens element having a positive power and a meniscus shape with a convex surface facing the object, in which at least one surface, preferably both surfaces, of the first lens L1 is or are formed in aspherical shape. The second lens L2 is a lens element having a positive power with a convex surface facing the image (image surface), in which at least one surface, preferably both surfaces, of the second lens L2 is or are formed in aspherical shape. More preferably, the second lens L2 is a biconvex lens having a positive power with at least one surface, preferably both surfaces, of the second lens L2 being formed in aspherical shape.

Now assuming that the surface of the first lens L1 facing the object has a radius of curvature R1 and that facing the image has a radius of curvature R2, while the second lens L2 has a center thickness d3 and the entire image taking lens LA has a focal length F. In order to obtain an image taking lens LA which is small in size and has a high optical performance, the relation between R1 and R2 is set to satisfy the following formula (1), and the relation between d3 and f is set to satisfy the following formula (2).

$$0.30 < R1/R2 < 0.65 \quad (1)$$

$$0.30 < d3/F < 0.50 \quad (2)$$

Formula (1) provides a degree of meniscus of the first lens L1. The image taking lens LA satisfies formula (1), preferably satisfies $0.40 < R1/R2 < 0.65$, and more preferably $0.50 < R1/R2 < 0.65$. If the ratio R1/R2 is not larger than the lower limit in formula (1), the front principal point of the first lens L1 may be so close to the image surface, so that it difficult to downsize the image taking lens LA. On the other hand, if the ratio R1/R2 is not smaller than the upper limit in formula (1), it is difficult to correct distortion aberration of the image taking lens LA.

Formula (2) provides a relation between the center thickness d3 of the second lens L2 and the focal length F of the entire image taking lens LA. The image taking lens LA satisfies formula (2), preferably satisfies $0.33 < d3/F < 0.50$. If the ratio d3/F is not larger than the lower limit in formula (2), it may be difficult to manufacture the second lens L2 although the image taking lens LA can be small in size. On the other hand, if the ratio d3/F is not smaller than the upper limit in formula (2), it may be difficult to downsize the image taking lens LA or to secure a back focus of the image taking lens LA.

The second lens L2 corrects aberrations generated by the first lens L1. Thus, the second lens L2 has a convex surface facing the image surface, and more preferably has a biconvex shape. Furthermore, assuming that the first lens has a center thickness d1, while the distance between the image-side surface of the first lens L1 and the object-side surface of the second lens L2 is d2, the relation between d1 and d2 is set to satisfy the following formula (3), and the relation between d1 and d3 is set to satisfy the following formula (4).

$$0.60 < d1/d2 < 1.80 \quad (3)$$

$$0.40 < d1/d3 < 0.85 \quad (4)$$

Formula (3) provides a relation between the center thickness d1 of the first lens L1 and the distance d2 between the surface of the first lens L1 disposed in the image-side and the surface of the second lens L2 disposed in the object-side. The image taking lens LA satisfies formula (3), more preferably $0.65 < d1/d2 < 1.75$. If the ratio d1/d2 is not larger than the lower limit in formula (3), the distance between the first lens L1 and the second lens L2 may be so long, so that it difficult to downsize the image taking lens LA. On the other hand, if the ratio d1/d2 is not smaller than the upper limit in formula (3), it may be difficult to correct various aberrations, particularly chromatic aberration.

Formula (4) provides a relation between the center thickness d1 of the first lens L1 and the center thickness d3 of the second lens L2. The image taking lens LA satisfies formula (4), preferably satisfies $0.50 < d1/d3 < 0.80$. If the ratio d1/d3 is not larger than the lower limit in formula (4), it is difficult to downsize the image taking lens LA. On the other hand, if the ratio d1/d3 is not smaller than the upper limit in formula (4), the center thickness d1 of the first lens L1 may be so large as to make it difficult to downsize the image taking lens LA and correct aberrations.

By designing the image taking lens LA to satisfy the above formulae, the image taking lens LA can be made small in size such that the focal length f of the entire image taking lens LA is 2.000 mm or smaller, the center thickness d1 of the first lens L1 is 0.400 mm or smaller, and the center thickness d3 of the second lens L2 is 0.600 mm or smaller.

Subsequently, a method of manufacturing the image taking lens LA will be described. The first lens L1 and the second lens L2 can be formed of a transparent glass material or a transparent resin material. When a glass material is used, it is preferable that the glass material has a glass transition temperature of 400 degrees Celsius or lower, so as to enable to improve the durability of a mold for forming the lens. Materials used for the lenses elements have a refractive index (for sodium D line) of 1.450 to 1.650, more preferably 1.500 to 1.600, as measured in compliance with ASTM D542, and have a light transmittance of 80% or more, preferably 85% or more, in a wavelength range of 450 to 600 nm.

Resin materials are suitable for effectively forming lens elements having a complex surface shape, and in some cases, more preferable than a glass material in view of productivity. The resin materials can be either thermoplastic or thermosetting. The first lens L1 can be formed of the same material as or different material from that of the second lens L2.

As for preferable specific examples of the resin material, an amorphous polyolefin resin having a ring structure such as cyclo ring, a polystyrene resin, an acryl resin, a polycarbonate resin, a polyester resin, an epoxy resin, a silicone resin, and so on, can be recited. Among these resin materials, polyolefin, which contains cycloolefin, polyolefin containing ring olefin, and so on, is preferably used. The resin material can be formed into a lens element by a known method such as injection molding, compression molding, cast molding, transfer molding, and so on.

It is well known that the refractive index of a resin material varies with temperature change. In order to reduce this variation, it is possible to use one of the transparent resin materials described above, into which fine particles of silica, niobium oxide, titanium oxide, aluminum oxide or the like having an average particle size of 100 nm or less, more preferably 50 nm or less are mixed and dispersed.

When the first lens L1 and the second lens L2 are formed of a resin material, a flange can be provided on an outer peripheral portion of the first lens L1 and the second lens L2 respectively. The shape of the flange is not limited to any specific one insofar as it does not impair the performance of the lenses. From the viewpoint of the moldability of the lens, the thickness of the flange is preferably in the range of 70 to 130% of the thickness of the outer peripheral portion of the lens. When such flange is formed on the outer peripheral portion of the lens, incident light to the flange may cause ghost or flare. In such a case, a light shielding mask may be provided as needed between the lenses to limit the incident light.

Before assembling the image taking lens LA to be used, for example, for an imaging module, the first lens L1 and the second lens L2 can be subjected, on at least one of the surfaces thereof facing the object and the image, to a known surface treatment such as antireflection coating, IR cut coating or surface hardening. The image taking lens LA may be used in an imaging module for a module camera of a mobile phone, a web camera, a personal computer, a digital camera, an optical sensor or a monitor for various industrial apparatuses such as an automobile, and so on.

PRACTICAL EXAMPLES

Hereinafter, practical examples of the image taking lens LA of the present invention will be described. Reference symbols used in the description of the following practical examples are as follows. Note that the unit of distance, radius, and center thickness is millimeter (mm).

| | |
|---|---|
| F | focal length of entire image taking lens LA; |
| F1 | focal length of first lens L1; |
| F2 | focal length of second lens L2; |
| fno | f-number (aperture number); |
| S1 | aperture (stop) |
| R | radius of curvature of an optical surface, or central radius of curvature when the optical element is a lens; |
| R1 | radius of curvature of a surface of first lens L1 disposed in object-side; |
| R2 | radius of curvature of a surface of first lens L1 disposed in image-side; |
| R3 | radius of curvature of a surface of second lens L2 disposed in object-side; |
| R4 | radius of curvature of a surface of second lens L2 disposed in image-side; |
| R5 | radius of curvature of a surface of parallel glass plate GF disposed in object-side; |
| R6 | radius of curvature of a surface of parallel glass plate GF disposed in image-side; |
| d | center thickness of lens or distance between lenses; |
| d1 | center thickness of first lens L1; |
| d2 | distance between a surface of first lens L1 in image-side and a surface of second lens L2 in object-side; |
| d3 | center thickness of second lens L2; |
| d4 | distance between a surface of second lens L2 in image-side and a surface of parallel glass plate GF in object-side; |
| d5 | center thickness of parallel glass plate GF; |
| nd | refractive index for sodium D-line; |
| n1 | refractive index of first lens L1; |
| n2 | refractive index of second lens L2; |
| n3 | refractive index of parallel glass plate GF; |
| vd | Abbe's number for sodium D-line; |
| v1 | Abbe's number of first lens L1; |
| v2 | Abbe's number of second lens L2; |
| v3 | Abbe's number of parallel glass plate GF; |
| TTL | optical path length of image taking lens LA |

The shapes of the aspherical shape of each surface of the first and second lenses L1 and L2 forming the image taking lens LA are expressed by the following aspherical polynomial (5), assuming that y-axis is an optical axis with a light traveling direction taken as positive, and x-axis is an axis perpendicular to the optical axis:

$$y=(x^2/R)/[1+\{1-(k+1)(x/R)^2\}^{1/2}]+A4x^4+A6x^6+A8x^8+A10x^{10}+A12x^{12}+A14x^{14} \quad (5)$$

Hereupon, the symbol "R" designates a radius of curvature on the optical axis, the symbol "k" designates a coefficient of cone, and the symbols "A4", "A6", "A8", "A10" and "A12" respectively designate aspherical coefficients.

For convenience, aspherical surfaces expressed by the aspherical polynomial (5) are used here. However, the aspherical surfaces are not particularly limited to those expressed by the aspherical polynomial (5).

First Practical Example

Figure 2:
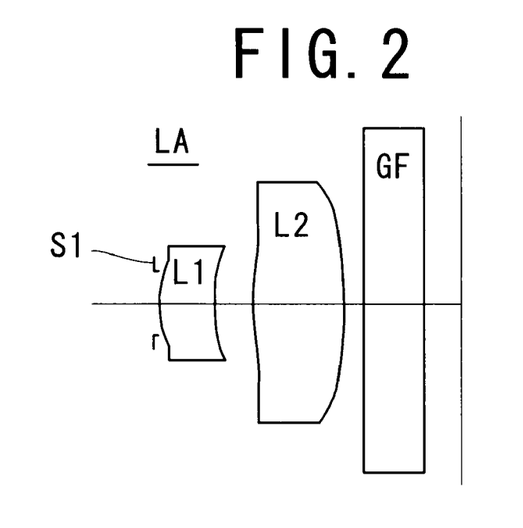
FIG. 2 is a diagram showing a configuration of an image taking lens in accordance with a first practical example.

FIG. 2 is a view showing a configuration of a lens system of the image taking lens LA in accordance with a first practical example. Table 1 shows the parameters of the first lens L1 and the second lens L2 forming the image taking lens LA in accordance with the first practical example that are: radii of curvature "R" on the object side and the image side; center thicknesses of or distances "d" between the lenses; refractive indices "nd"; and Abbe numbers "vd". On the other hand, Table 2 shows conical coefficients "k" and aspherical coefficients "A4", "A6", "A8", "A10", "A12" and "A14".

TABLE 1

|    | R      | d         | nd        | vd         |
|----|--------|-----------|-----------|------------|
| S1 | ∞      | 0.020     |           |            |
| R1 | 0.524  | d1 = 0.280 | n1 = 1.509 | v1 = 56.20 |
| R2 | 0.874  | d2 = 0.194 |           |            |
| R3 | 0.993  | d3 = 0.455 | n2 = 1.509 | v2 = 56.20 |
| R4 | −3.132 | d4 = 0.100 |           |            |
| R5 | ∞      | d5 = 0.300 | n3 = 1.562 | v3 = 64.17 |
| R6 | ∞      |           |           |            |

TABLE 2

|    | Conical Coefficient | Aspherical Coefficients | | | | | |
|----|----|----|----|----|----|----|----|
|    | k | A4 | A6 | A8 | A10 | A12 | A14 |
| R1 | 7.585E−01  | −1.372E+00 | 4.324E+01  | −7.088E+02 | 9.589E+02  | 0.000E+00  | 0.000E+00 |
| R2 | −4.671E+00 | 4.503E−01  | −7.088E+00 | 6.457E+02  | −4.539E+03 | 0.000E+00  | 0.000E+00 |
| R3 | −2.296E+01 | −8.121E−01 | 3.592E+00  | −1.882E+01 | 2.366E+01  | −1.517E+02 | 0.000E+00 |
| R4 | 0.000E+00  | −1.474E−01 | −9.681E−01 | 2.097E+00  | −5.612E−01 | −1.253E+01 | 0.000E+00 |

Table 9 described later shows specific values of the image taking lens LA of the first practical example which are based on the parameters shown in Tables 1 and 2. As shown in Table 9 (column of the first practical example), the parameters of the image taking lens LA of the first practical example satisfy formulae (1) to (4), in which the focal length "F" of the entire image taking lens LA and the optical path length "TTL" are short.

Figure 3:
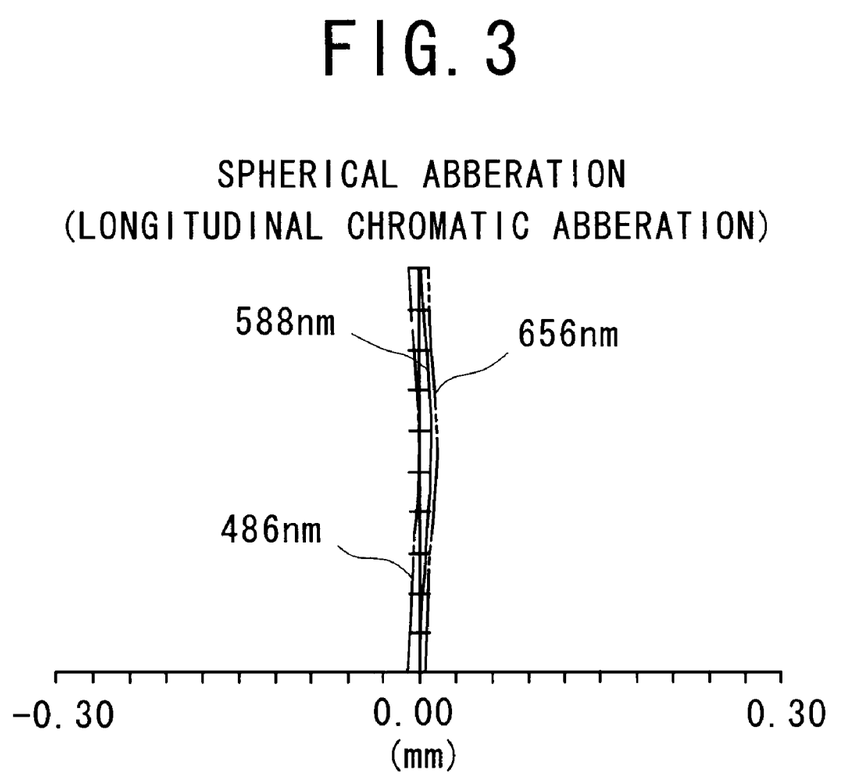
FIG. 3 is a graph showing spherical aberrations of the image taking lens of the first practical example.
Figure 4A:
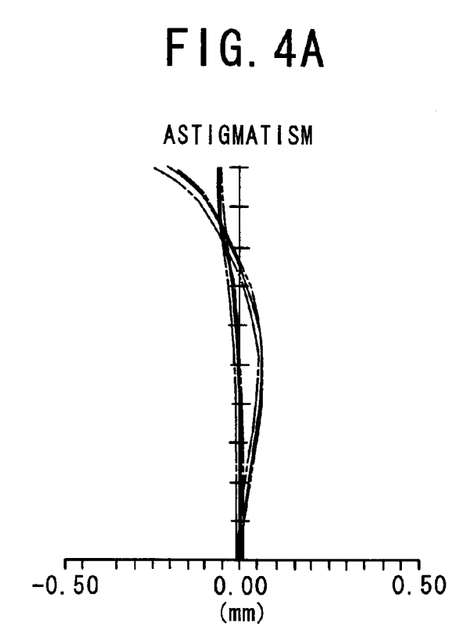
FIG. 4A and FIG. 4B are graphs respectively showing astigmatisms and distortions of the image taking lens of the first practical example.
Figure 4B:
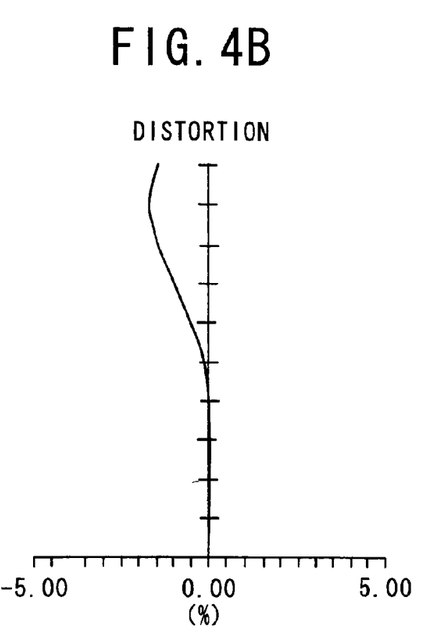
Figure 5:
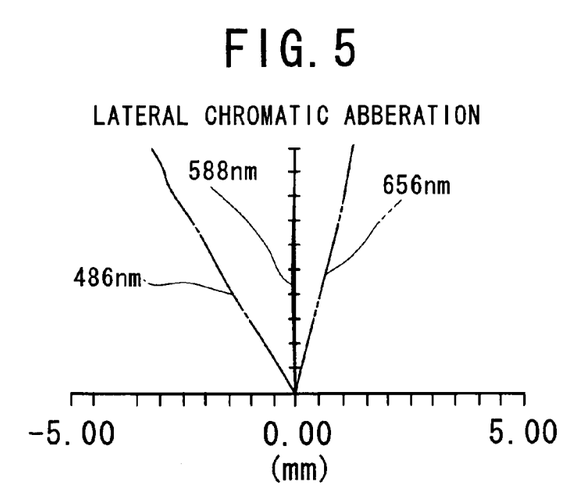
FIG. 5 is a graph showing lateral chromatic aberrations of the image taking lens of the first practical example.

FIG. 3 shows spherical aberrations (longitudinal or axial chromatic aberrations), FIG. 4 shows astigmatisms and distortions, and FIG. 5 shows lateral chromatic aberrations, of the image taking lens LA of the first practical example. Note that the respective aberrations in each of FIGS. 3 to 5 are those with three different wavelengths 486 nm, 588 nm and 656 nm. In FIG. 4, the curves designated by symbol "S" show astigmatisms on the sagittal image surface while the curves designated by symbol "T" show astigmatisms on the tangential image surface. These results indicate that the image taking lens LA in accordance with the first practical example is small in size and has a high optical performance.

Second Practical Example

Figure 6:
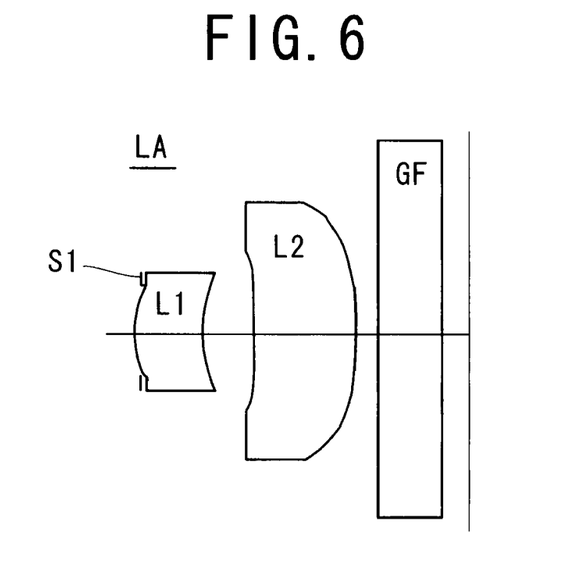
FIG. 6 is a diagram showing a configuration of an image taking lens in accordance with a second practical example.

FIG. 6 is a view showing a configuration of a lens system of the image taking lens LA in accordance with a second practical example. Table 3 shows the parameters of the first lens L1 and the second lens L2 forming the image taking lens LA in accordance with the second practical example that are: radii of curvature "R" on the object side and the image side; center thicknesses of or distances "d" between the lenses; refractive indices "nd"; and Abbe's numbers "vd". On the other hand, Table 4 shows conical coefficients "k" and aspherical coefficients "A4", "A6", "A8", "A10", "A12" and "A14".

TABLE 3

|    | R      | d          | nd         | vd         |
|----|--------|------------|------------|------------|
| S1 | ∞      | −0.040     |            |            |
| R1 | 0.470  | d1 = 0.320 | n1 = 1.544 | v1 = 56.10 |
| R2 | 0.930  | d2 = 0.242 |            |            |

TABLE 3-continued

|    | R       | d          | nd         | vd         |
|----|---------|------------|------------|------------|
| R3 | 25.947  | d3 = 0.485 | n2 = 1.509 | v2 = 56.20 |
| R4 | −1.563  | d4 = 0.100 |            |            |
| R5 | ∞       | d5 = 0.300 | n3 = 1.562 | v3 = 64.17 |
| R6 | ∞       |            |            |            |

TABLE 4

|    | Conical Coefficient | Aspherical Coefficients | | | | | |
|----|----|----|----|----|----|----|----|
|    | k | A4 | A6 | A8 | A10 | A12 | A14 |
| R1 | 1.450E−01 | −2.386E+00 | 1.007E+02  | −8.307E+02 | −1.423E+04 | 1.762E+05  | 0.000E+00  |
| R2 | 4.022E+00 | 3.365E+00  | −6.688E+01 | 1.067E+03  | 2.145E+03  | −7.657E+04 | 0.000E+00  |
| R3 | 0.000E+00 | −1.533E+00 | 1.828E+00  | −1.476E+01 | −9.369E+01 | −1.963E+03 | 1.233E+04  |
| R4 | 9.267E−01 | 7.386E−02  | −2.358E+00 | 4.726E−02  | 5.842E+00  | 7.642E−01  | −5.167E+01 |

As shown in Table 9 (column of the second practical example), the parameters of the image taking lens LA of the second practical example satisfy formulae (1) to (4), in which the focal length "F" of the entire image taking lens LA and the optical path length "TTL" are short.

Figure 7:
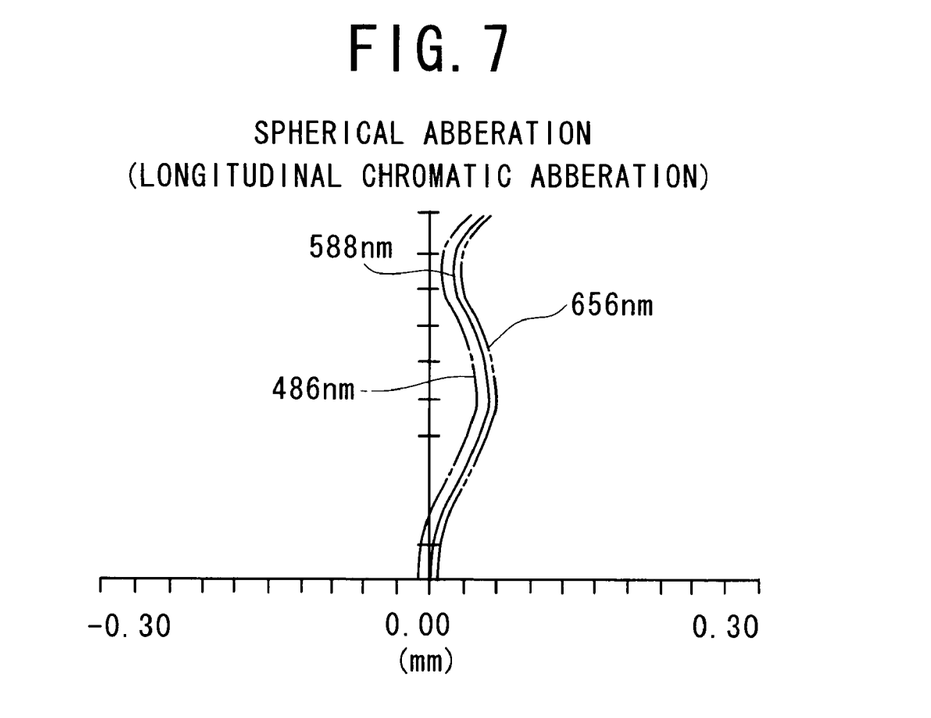
FIG. 7 is a graph showing spherical aberrations of the image taking lens of the second practical example.
Figure 8A:
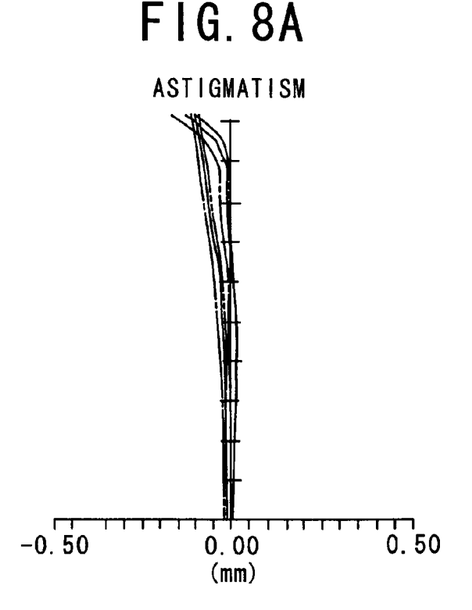
FIG. 8A and FIG. 8B are graphs respectively showing astigmatisms and distortions of the image taking lens of the second practical example.
Figure 8B:
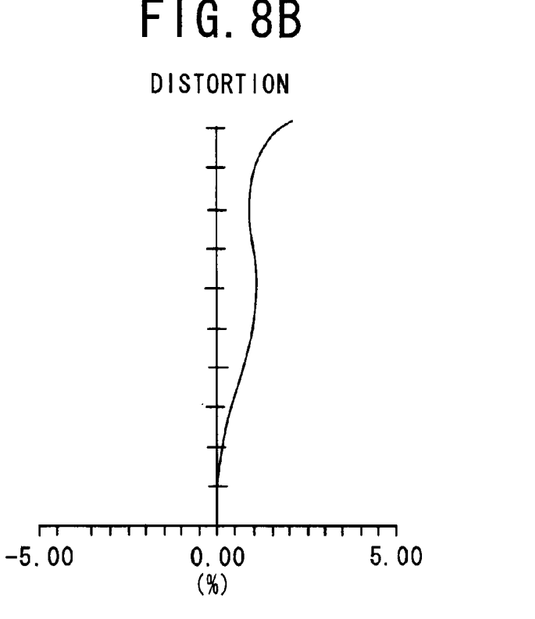
Figure 9:
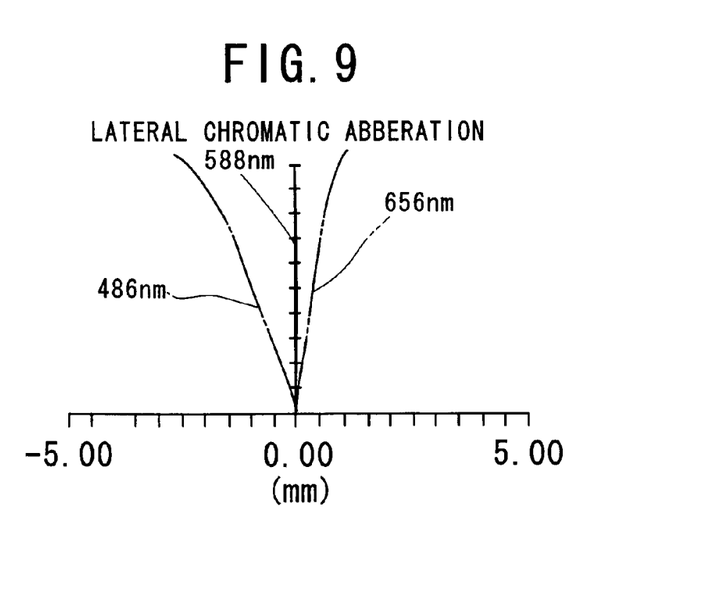
FIG. 9 is a graph showing lateral chromatic aberrations of the image taking lens of the second practical example.

FIG. 7 shows spherical aberrations (longitudinal or axial chromatic aberrations), FIG. 8 shows astigmatisms and distortions, and FIG. 9 shows lateral chromatic aberrations, of the image taking lens LA of Practical Example 2. Note that the respective aberrations in each of FIGS. 7 to 9 are those with three different wavelengths 486 nm, 588 nm and 656 nm. In FIG. 8, the curves designated by symbol "S" show astigmatisms on the sagittal image surface while the curves designated by symbol "T" show astigmatisms on the tangential image surface. These results indicate that the image taking lens LA in accordance with the second practical example is small in size and has a high optical performance.

Third Practical Example

Figure 10:
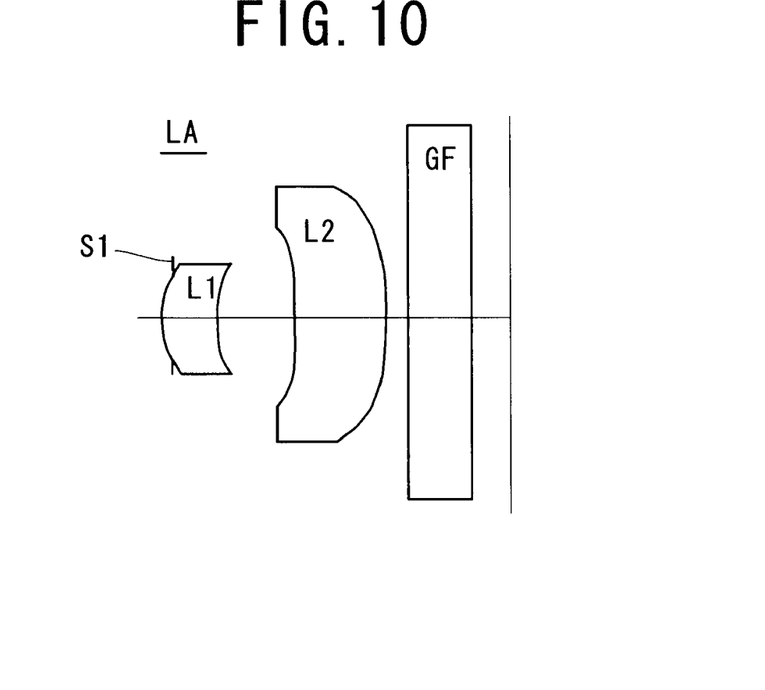
FIG. 10 is a diagram showing a configuration of an image taking lens in accordance with a third practical example.

FIG. 10 is a view showing a configuration of a lens system of the image taking lens LA in accordance with a third practical example. Table 5 shows the parameters of the first lens L1 and the second lens L2 forming the image taking lens LA in accordance with the third practical example that are: radii of curvature "R" on the object side and the image side; center thicknesses of or distances "d" between the lenses; refractive indices "nd"; and Abbe numbers "vd". On the other hand, Table 6 shows conical coefficients "k" and aspherical coefficients "A4", "A6", "A8", "A10", "A12" and "A14".

TABLE 5

|    | R        | d          | nd         | vd         |
|----|----------|------------|------------|------------|
| S1 | ∞        | −0.050     |            |            |
| R1 | 0.436    | d1 = 0.253 | n1 = 1.544 | v1 = 56.10 |
| R2 | 0.741    | d2 = 0.361 |            |            |
| R3 | 200.491  | d3 = 0.444 | n2 = 1.509 | v2 = 56.20 |
| R4 | −1.677   | d4 = 0.100 |            |            |
| R5 | ∞        | d5 = 0.300 | n3 = 1.562 | v3 = 64.17 |
| R6 | ∞        |            |            |            |

TABLE 6

|    | Conical Coefficient | Aspherical Coefficients | | | | | |
|----|---------|-----------|-----------|-----------|-----------|-----------|-----------|
|    | k | A4 | A6 | A8 | A10 | A12 | A14 |
| R1 | 2.773E−01 | −1.548E+00 | 6.715E+01 | −5.113E+02 | −6.654E+03 | 8.105E+04 | 0.000E+00 |
| R2 | 3.762E+00 | 3.140E+00 | −4.614E+01 | 1.012E+02 | −7.763E+02 | −2.436E+04 | 0.000E+00 |
| R3 | −1.679E+08 | −1.653E+00 | 1.437E+00 | −1.605E+01 | −1.037E+02 | −2.014E+03 | 1.188E+04 |
| R4 | 4.436E+00 | −3.845E−02 | −2.636E+00 | −4.219E−01 | 5.401E+00 | 1.124E+00 | −4.854E+01 |

As shown in Table 9 (column of the third practical example), the parameters of the image taking lens LA of the third practical example satisfy formulae (1) to (4), in which the focal length "F" of the entire image taking lens LA and the optical path length "TTL" are short.

Figure 11:
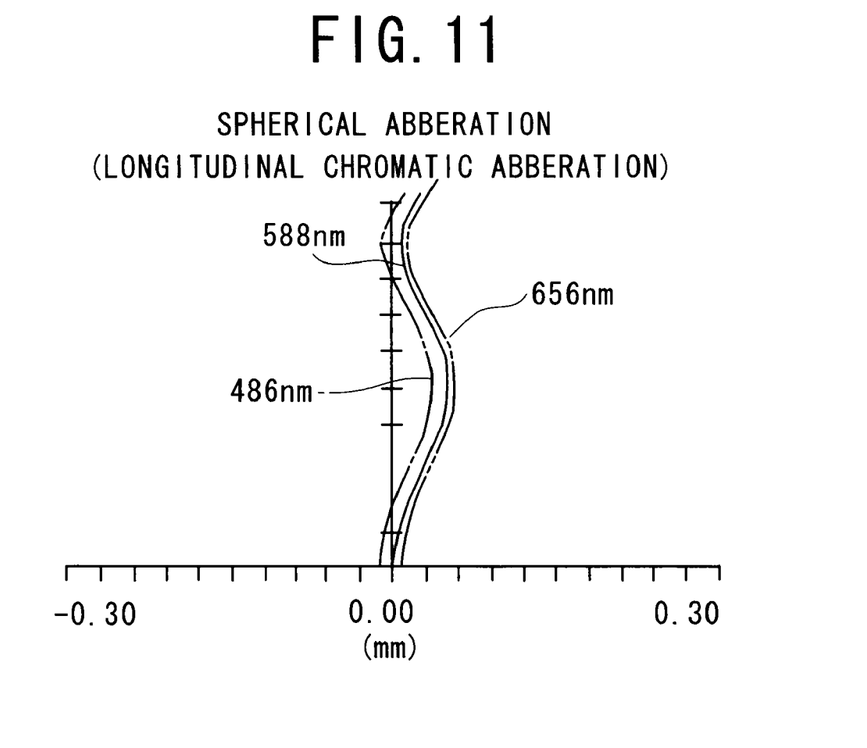
FIG. 11 is a graph showing spherical aberrations of the image taking lens of the third practical example.
Figure 12A:
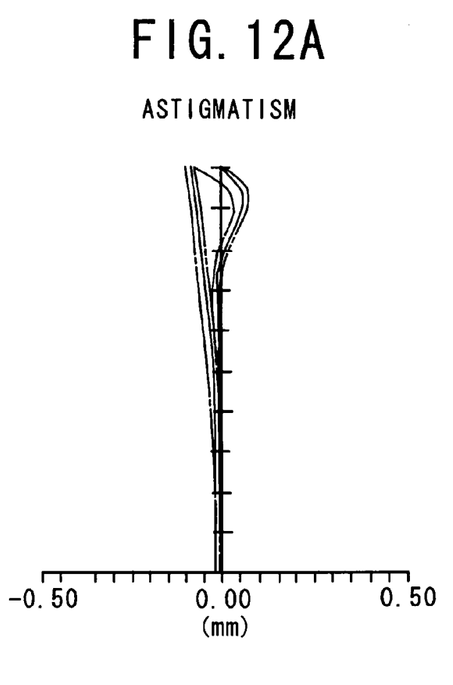
FIG. 12A and FIG. 12B are graphs respectively showing astigmatisms and distortions of the image taking lens of the third practical example.
Figure 12B:
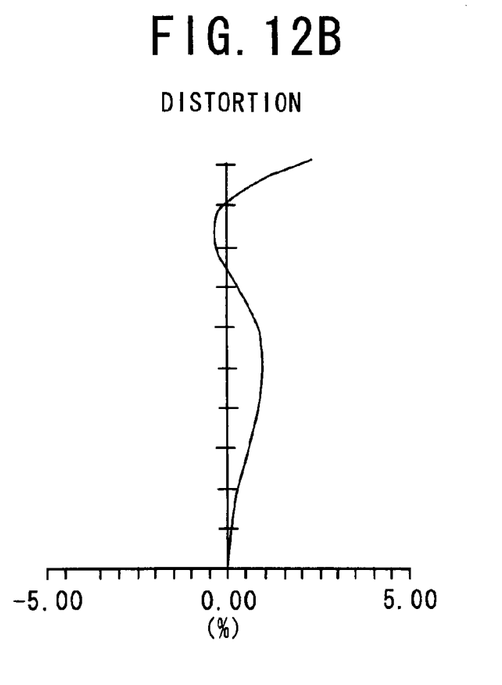
Figure 13:
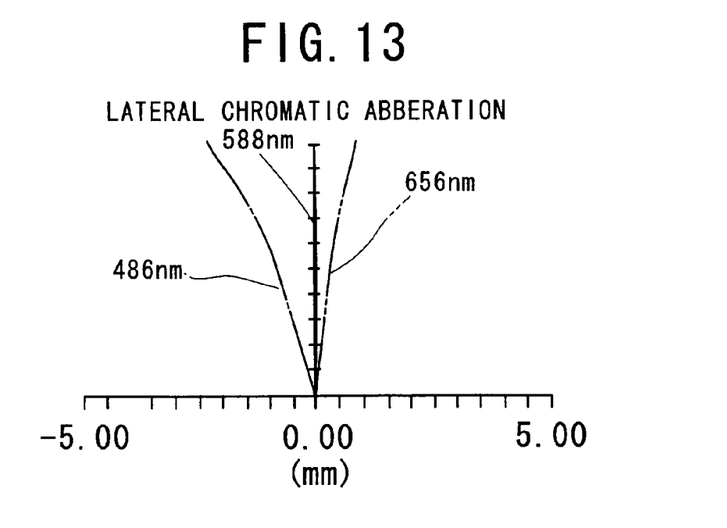
FIG. 13 is a graph showing lateral chromatic aberrations of the image taking lens of the third practical example.

FIG. 11 shows spherical aberrations (longitudinal or axial chromatic aberrations), FIG. 12 shows astigmatisms and distortions, and FIG. 13 shows lateral chromatic aberrations, of the image taking lens LA of Practical Example 3. Note that the respective aberrations in each of FIGS. 11 to 13 are those with three different wavelengths 486 nm, 588 nm and 656 nm. In FIG. 12, the curves designated by symbol "S" show astigmatisms on the sagittal image surface while the curves designated by symbol "T" show astigmatisms on the tangential image surface. These results indicate that the image taking lens LA in accordance with the third practical example is small in size and has a high optical performance.

Fourth Practical Example

Figure 14:
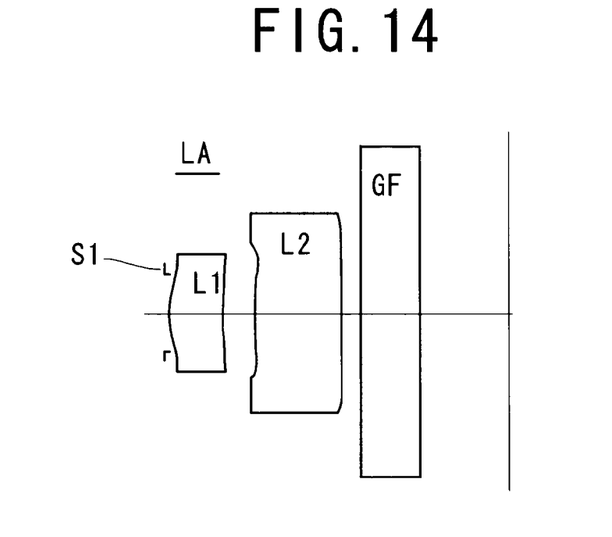
FIG. 14 is a diagram showing a configuration of an image taking lens in accordance with a fourth practical example.

FIG. 14 is a view showing a configuration of a lens system of the image taking lens LA in accordance with a fourth practical example. Table 7 shows the parameters of the first lens L1 and the second lens L2 forming the image taking lens LA in accordance with the fourth practical example that are: radii of curvature "R" on the object side and the image side; center thicknesses of or distances "d" between the lenses; refractive indices "nd"; and Abbe numbers "vd". On the other hand, Table 8 shows conical coefficients "k" and aspherical coefficients "A4", "A6", "A8", "A10", "A12" and "A14".

TABLE 7

|    | R       | d          | nd         | vd         |
|----|---------|------------|------------|------------|
| S1 | ∞       | 0.020      |            |            |
| R1 | 0.723   | d1 = 0.280 | n1 = 1.509 | v1 = 56.20 |
| R2 | 1.303   | d2 = 0.168 |            |            |
| R3 | 1.119   | d3 = 0.468 | n2 = 1.509 | v2 = 56.20 |
| R4 | −20.000 | d4 = 0.100 |            |            |

TABLE 7-continued

|    | R | d | nd | vd |
|----|---|---|-----|------|
| R5 | ∞ | d5 = 0.300 | n3 = 1.562 | v3 = 64.17 |
| R6 | ∞ |  |  |  |

TABLE 8

|    | Conical Coefficient | Aspherical Coefficients | | | | | |
|----|---------|-----------|-----------|-----------|-----------|-----------|-----------|
|    | k | A4 | A6 | A8 | A10 | A12 | A14 |
| R1 | 3.880E−01 | −2.128E−01 | −3.206E+01 | 4.118E+02 | −7.724E+02 | 0.000E+00 | 0.000E+00 |
| R2 | −5.089E+01 | −1.266E+00 | 1.424E+01 | −3.766E+02 | 1.954E+03 | 0.000E+00 | 0.000E+00 |
| R3 | −3.736E+01 | −1.053E+00 | 1.175E+00 | −3.507E+01 | −9.363E+01 | −2.921E+03 | 0.000E+00 |
| R4 | 0.000E+00 | 1.107E−01 | −1.210E+00 | 3.455E−01 | −4.553E+00 | 1.581E+00 | 0.000E+00 |

As shown in Table 9 (column of the fourth practical example), the parameters of the image taking lens LA of the fourth practical example satisfy formulae (1) to (4), in which the focal length "F" of the entire image taking lens LA and the optical path length "TTL" are short.

Figure 15:
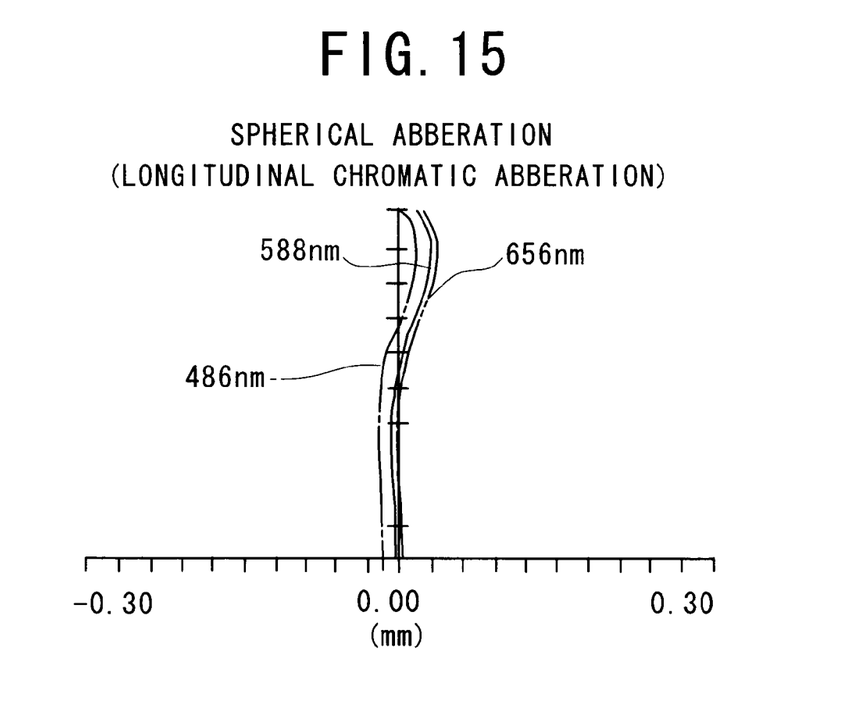
FIG. 15 is a graph showing spherical aberrations of the image taking lens of the fourth practical example.
Figure 16A:
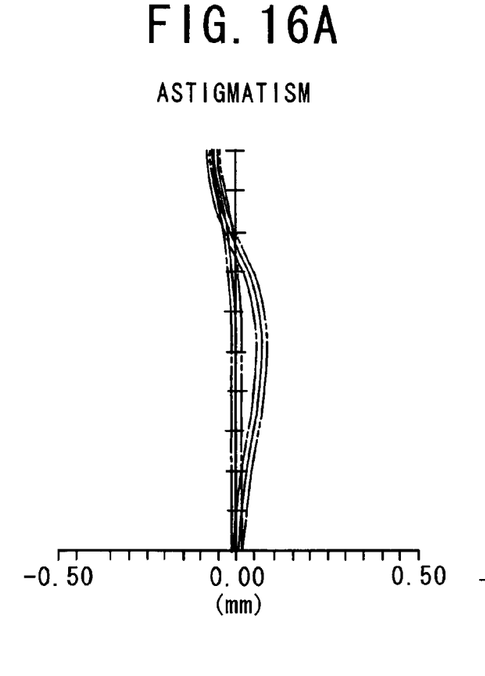
FIG. 16A and FIG. 16B are graphs respectively showing astigmatisms and distortions of the image taking lens of the fourth practical example.
Figure 16B:
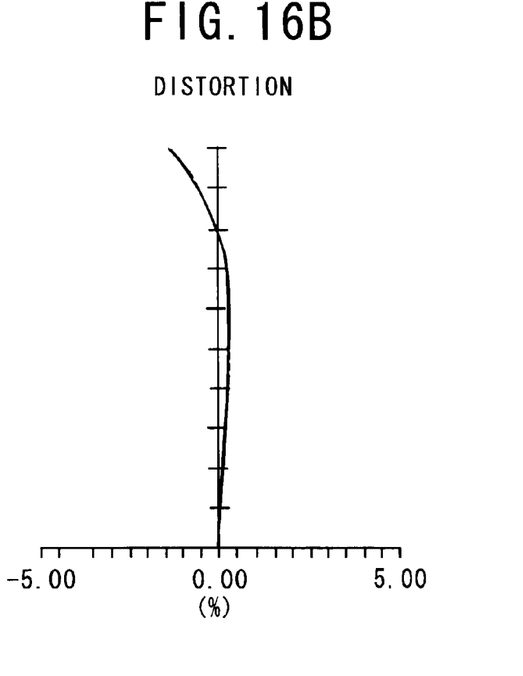
Figure 17:
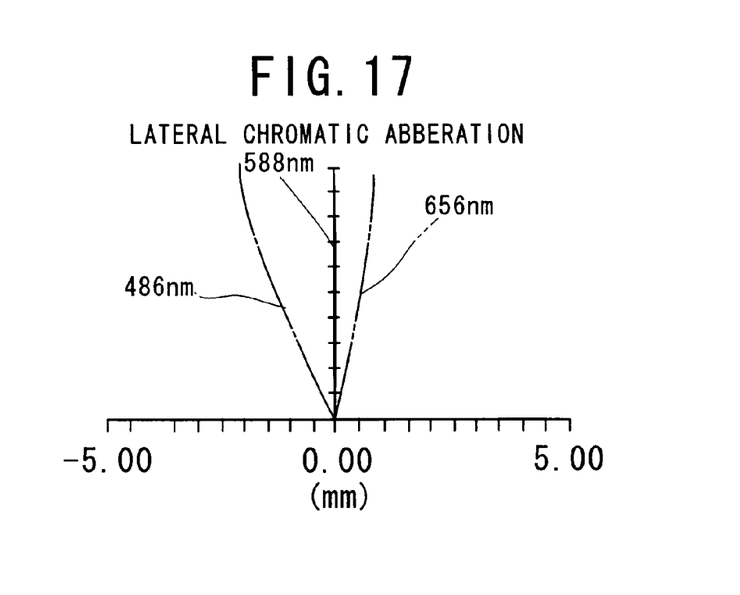
FIG. 17 is a graph showing lateral chromatic aberrations of the image taking lens of the fourth practical example.

FIG. 15 shows spherical aberrations (longitudinal or axial chromatic aberrations), FIG. 16 shows astigmatisms and distortions, and FIG. 17 shows lateral chromatic aberrations, of the image taking lens LA of Practical Example 4. Note that the respective aberrations in each of FIGS. 3 to 5 are those with three different wavelengths 486 nm, 588 nm and 656 nm. In FIG. 16, the curves designated by symbol "S" show astigmatisms on the sagittal image surface while the curves designated by symbol "T" show astigmatisms on the tangential image surface. These results indicate that the image taking lens LA in accordance with Practical Example 4 is small in size and has a high optical performance.

Table 9 shows specific values of the parameters defined in the above-described formulae (1) to (4) with respect to the first to fourth practical examples. Note that the unit of each parameter F, F1, F2 and TTL shown in Table 9 is millimeters (mm), that is, F (mm), F1 (mm), F2 (mm) and TTL (mm).

TABLE 9

|       | Example 1 | Example 2 | Example 3 | Example 4 | Remarks     |
|-------|-----------|-----------|-----------|-----------|-------------|
| R1/R2 | 0.599     | 0.505     | 0.589     | 0.555     | Formula (1) |
| d3/F  | 0.428     | 0.408     | 0.344     | 0.350     | Formula (2) |
| d1/d2 | 1.442     | 1.321     | 0.701     | 1.666     | Formula (3) |
| d1/d3 | 0.615     | 0.659     | 0.569     | 0.597     | Formula (4) |
| fno   | 3.2       | 2.8       | 2.8       | 3.2       |             |
| F     | 1.063     | 1.191     | 1.292     | 1.339     |             |
| F1    | 2.022     | 1.403     | 1.508     | 2.746     |             |
| F2    | 1.538     | 2.914     | 3.268     | 2.097     |             |
| TTL   | 1.544     | 1.574     | 1.628     | 1.818     |             |

As can be seen from Table 9, the image taking lens in accordance with the above-described first to fourth practical examples satisfy the formulae (1) to (4).

This application is based on Japanese patent application 2008-008130 filed Jan. 17, 2008, the content of which is hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image taking lens comprising:
an aperture,
a first lens, and
a second lens, the aperture, the first lens and the second lens arranged in this order from an object side to an image side, wherein
the first lens has a positive power and a meniscus shape with a convex surface facing an object and a concave surface facing an image, the second lens has a positive power with a convex surface facing the image, and
the first lens and the second lens satisfy the following formulae (1) and (2):

$$0.40 < R1/R2 < 0.65 \quad (1)$$

$$0.33 < d3/F < 0.50 \quad (2)$$

where
R1: radius of curvature of the convex surface of the first lens facing the object;
R2: radius of curvature of the concave surface of the first lens facing the image;
d3: center thickness of the second lens; and
F: focal length of the entire image taking lens.

2. The image taking lens in accordance with claim 1, wherein the second lens is a biconvex lens.

3. The image taking lens in accordance with claim 1, wherein R1/R2 in formula (I) is larger than 0.50.

4. The image taking lens in accordance with any of claims 1, 2 and 3, further satisfying the following formulae (3) and (4):

$$0.60 < d1/d2 < 1.80 \quad (3)$$

$$0.40 < d1/d3 < 0.85 \quad (4)$$

where
d1: center thickness of the first lens; and
d2: distance between the surface of the first lens facing the image and the surface of the second lens facing the object.

5. The image taking lens in accordance with claim 1, wherein F<2.00 mm.

6. The image taking lens in accordance with claim 1, wherein d1<0.400 mm, where
d1: center thickness of the first lens.

* * * * *